J. W. FAWKES.

Corn-Planter.

No. 8,054. Reissued Jan. 22, 1878.

Witnesses:
Frank L. Durand
H. Aubrey Fairbairn

Inventor:
J. W. Fawkes
Alexander Mason
Attorneys.

N. PETERS, PHOTO-LITHOGRAPHER, WASHINGTON, D. C.

UNITED STATES PATENT OFFICE.

JOSEPH W. FAWKES, OF MAROA, ILLINOIS.

IMPROVEMENT IN CORN-PLANTERS.

Specification forming part of Letters Patent No. 49,250, dated August 8, 1865; Reissue No. 8,054, dated January 22, 1878; application filed December 18, 1877.

*To all whom it may concern:*

Be it known that I, JOS. W. FAWKES, of Maroa, in the county of Macon and State of Illinois, have invented certain new and useful Improvements in Corn-Planters; and I do hereby declare that the following is a full, clear, and exact description thereof, reference being had to the accompanying drawings, and to the letters of reference marked thereon, which form a part of this specification.

This invention relates to a new and useful improvement in corn-dropping devices, and has for its object the dropping of the corn without breaking it, and the consequent even distribution of the same.

In order to enable others skilled in the art to which my invention appertains to make and use the same, I will now proceed to describe its construction and operation, referring to the annexed drawings, in which—

Figure 1:
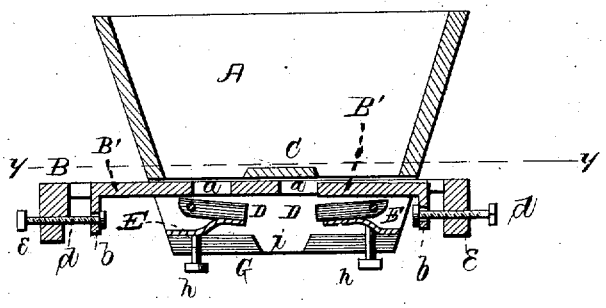
Figure 2:
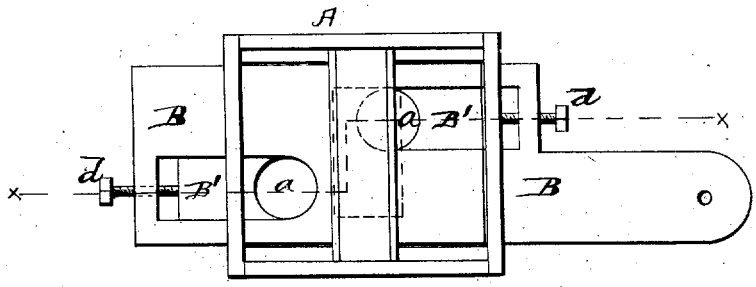

Figure 1 is a vertical section of my invention, taken on the line *x x*, Fig. 2. Fig. 2 is a horizontal section of the same on the line *y y*, Fig. 1.

The ordinary corn-dropping devices, which are provided with perforated reciprocating slides, are, as a general thing, the most preferable; but they are attended with the disadvantage of breaking the corn, caused by the uppermost projecting grain or kernel in the perforation or seed-cell of the reciprocating slide being brought in contact with the cut-off, the action being similar to a pair of shears.

This difficulty is fully obviated by my improvement.

A represents the hopper of a corn-planter, and B is the reciprocating slide, which has two perforations or seed-cells, *a a*, made through it; and C is a cut-off placed in the lower part of the hopper, underneath which the slide B works.

The perforations or seed-cells *a a* are capable of being contracted and enlarged for the purpose of dropping a greater or less number of grains at each movement of the slide B. This is accomplished by means of supplemental slides B′ B′, arranged in slots in the main slide B.

Each of the smaller slides B′ is, at its outer end, on the under side, provided with a projection, *b*, in which is swiveled a screw, *d*. This screw screws through a ledge or projection, *e*, on the under side, at the end of the main slide B, so that, by turning said screw *d*, the supplemental slide B′ can be moved out or in, as required, to adjust the size of the opening *a*.

The hole in the projection *b*, in which the end of the screw *d* is swiveled, is made larger than the screw, so as to allow the small slide B′ to tilt or turn downward at its inner end. These supplemental slides or bars B′ thus have a yielding motion when coming in contact with a grain of corn, and are pivoted at their outer ends by the screws *d*, which also regulate their position in main slide.

The bars B′ are supported upon bars D D underneath, which bars D are also pivoted at their outer ends, and held up by means of springs E E. The bars D are interposed between these springs and the bars B′ in the slide, simply to give a better bearing-surface than if the springs acted directly on said bars B′ in the slide.

The tension of the springs E may be regulated by means of set-screws *h·h* through the bottom plate G of the hopper, said bottom plate having a center opening, *i*, directly under the cut-off C.

It will readily be seen that if a grain should project from either of the cells *a* above the slide, instead of being broken by the cut-off C, the bar B′ will yield, turning upon its pivot, and thus allow the grain to pass out without injury.

Having thus fully described my invention, what I claim as new, and desire to secure by Letters Patent, is—

1. In a corn-planter, in connection with the seeding devices, the tilting bars or slides, for the purposes herein set forth.

2. The reciprocating dropping-slide, provided with tilting supplemental bars or slides, for the purposes herein set forth.

3. The reciprocating dropping-slide, provided with tilting bars, forming one side of the holes or cells, said bars being also adjustable, whereby the size of the dropping-holes may be regulated and the free ends of the bars yield, for the purpose set forth.

4. In combination with tilting bars arranged in the reciprocating slide of a corn-planter, springs arranged under said bars, for holding them in place and allowing them to yield, for the purposes herein set forth.

5. The combination of a reciprocating dropping-slide, tilting bars arranged therein, springs under said bars, and stationary pivoted bars interposed between the springs and the slides, substantially as and for the purposes herein set forth.

In testimony that I claim the foregoing I have hereunto set my hand this 6th day of November, 1877.

J. W. FAWKES.

Witnesses:
J. M. THOMPSON,
J. P. DAWN.